(No Model.)

H. J. BREWER.
POROUS CUP FOR GALVANIC BATTERIES.

No. 393,353. Patented Nov. 27, 1888.

Witnesses:
H. S. McArthur
Sidney L. Johnson

Inventor:
Horatio J. Brewer,
by his Attorneys
Dickerson, Foster & Freeman.

UNITED STATES PATENT OFFICE.

HORATIO J. BREWER, OF NEW YORK, N. Y.

POROUS CUP FOR GALVANIC BATTERIES.

SPECIFICATION forming part of Letters Patent No. 393,353, dated November 27, 1888.

Application filed April 5, 1888. Serial No. 269,763. (No model.)

*To all whom it may concern:*

Be it known that I, HORATIO J. BREWER, of the city, county, and State of New York, have invented a new and useful Improvement in Galvanic Batteries, of which the following is a full, true, and exact description, reference being had to the accompanying drawings.

My invention relates to an improvement in porous cups for galvanic batteries and in batteries made therewith, and is particularly applicable in its structure to batteries known as the "Leclanché battery," in which carbon and depolarizing substances are placed within a porous cup in contact with a conducting-rod of carbon. It is important, of course, that these porous cups shall possess the least possible resistance, while at the same time they should be strong enough to resist ordinary wear and tear and retain the materials placed within them. It has been found exceedingly difficult to exactly accomplish this desired result, for if they are made of clay and thoroughly baked they are too dense, and cause great internal resistance in the battery. On the other hand, if they are not well baked they are likely to be very fragile, and therefore inefficient. I have discovered a method of making a porous cup which will both have a low internal resistance and will additionally have sufficient strength to thoroughly well serve the purposes of such cups.

My invention consists in combining with the clay of a porous cup of a galvanic battery a considerable amount of vegetable matter which will disappear in burning, and thereby leave transverse linear channels of communication for the liquid through the porous cup. The material I prefer to use is that known as "excelsior." This I thoroughly mix with clay in about the proportions of one hundred pounds of clay to five pounds of excelsior. It is obvious that these proportions may be varied. I may likewise employ hair, though I prefer the excelsior. In the process of baking these vegetable matters disappear, and the cup can be baked thoroughly well without any danger of closing these pores. In the ordinary Leclanché porous-cup battery it has been impossible to completely seal them, an opening having to be left at the top for the escaping gas. By my form of porous cup, however, the gas is enabled to escape through the cup, and I am therefore enabled to completely seal the upper end of said cup, whose internal resistance is likewise reduced to a minimum.

My invention is applicable to many forms of battery, but I have shown it as applied to the ordinary Leclanché battery.

Figure 1:
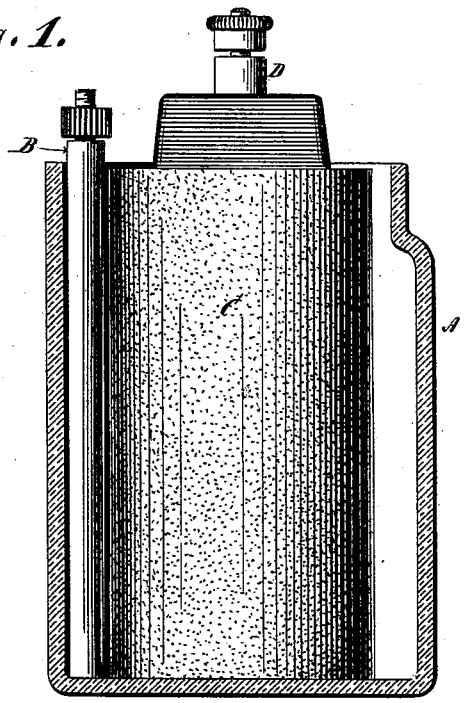
Figure 2:
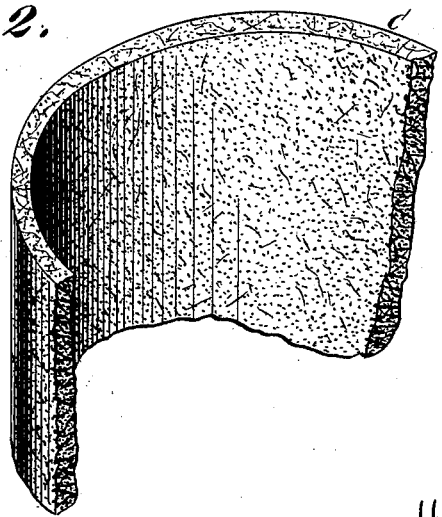

In the drawings, Figure 1 represents an elevation, partly in section, of my battery; and Fig. 2 a view, partly in section, of the porous cup.

A represents the cell, preferably of glass; B, the zinc; C, the porous cup containing the carbon, or carbon and depolarizing body in fragments surrounding the central conductor, D. It is apparent likewise that the inclosing-cup need not be of clay, but may be of carbon similarly prepared with openings therethrough or therein, which I find to be an advantageous form, and that carbon need not likewise be in the form of a porous cup, but may be in some forms of battery in the form of a block or prism or other suitable shape to form the electrode of the battery.

I am aware that it is old to make a porous cup by baking therein materials which do not traverse the body of the cup from side to side—such, for instance, as sawdust; but by my invention minute channels are left in the completed cup, traversing the same from side to side.

What I claim as my invention, and desire to secure by Letters Patent, is—

1. A porous cup for batteries, consisting of clay or carbon having transverse linear channels therethrough from side to side of the cup, substantially as described.

2. The combination of a porous cup containing fragments of carbon and a conductor embedded therein, the said porous cup having transverse linear passages therethrough for the escape of the liquid and gas, with an exterior zinc and a surrounding cell, substantially as described.

3. A carbon for batteries, which consists of a body of carbon having transverse openings therein or therethrough, remaining after the destruction of a body mixed with said carbon before baking and eliminated in the process of baking, substantially as described.

In testimony whereof I have signed my name to this specification in the presence of two subscribing witnesses.

HORATIO J. BREWER.

Witnesses:
ANTHONY GREF,
WM. A. POLLOCK.